US011345302B2

United States Patent
Moran

(10) Patent No.: US 11,345,302 B2
(45) Date of Patent: May 31, 2022

(54) CURTAIN AIRBAG WITH INTEGRAL AIRBAG WRAP

(71) Applicant: ZF Passive Safety Systems US Inc., Washington, MI (US)

(72) Inventor: Dylan Moran, Rochester Hills, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 30 days.

(21) Appl. No.: 16/939,220

(22) Filed: Jul. 27, 2020

(65) Prior Publication Data

US 2022/0024404 A1   Jan. 27, 2022

(51) Int. Cl.
*B60R 21/215* (2011.01)
*B60R 21/232* (2011.01)
*B60R 21/237* (2006.01)
*B60R 21/235* (2006.01)

(52) U.S. Cl.
CPC .......... *B60R 21/215* (2013.01); *B60R 21/232* (2013.01); *B60R 21/237* (2013.01); *B60R 2021/23509* (2013.01); *B60R 2021/23542* (2013.01)

(58) Field of Classification Search
CPC ... B60R 21/215; B60R 21/237; B60R 21/232; B60R 2021/23509; B60R 2021/23542; B60R 21/201
See application file for complete search history.

(56) References Cited

U.S. PATENT DOCUMENTS

| | | | | |
|---|---|---|---|---|
| 5,195,775 A | * | 3/1993 | Komerska | B60R 21/201 280/728.2 |
| 5,364,126 A | * | 11/1994 | Kuretake | B60R 21/237 102/531 |
| 5,730,463 A | * | 3/1998 | Fisher | B60R 21/207 280/728.1 |
| 5,755,459 A | * | 5/1998 | LaLonde | B60R 21/201 280/728.3 |
| 5,765,867 A | * | 6/1998 | French | B60R 21/16 280/743.1 |
| 5,884,939 A | * | 3/1999 | Yamaji | B60R 21/2171 280/743.1 |
| 5,997,037 A | * | 12/1999 | Hill | B60R 21/201 280/728.1 |
| 6,095,551 A | * | 8/2000 | O'Docherty | B60R 21/08 280/730.1 |

(Continued)

*Primary Examiner* — Paul N Dickson
*Assistant Examiner* — Timothy Wilhelm
(74) *Attorney, Agent, or Firm* — Tarolli, Sundheim, Covell & Tummino LLP

(57) ABSTRACT

In one aspect, an apparatus for helping to protect an occupant of a vehicle includes a curtain airbag having a stored condition in which the curtain airbag is deflated, flattened, and rolled and/or folded. A wrap includes an integral woven portion of the curtain airbag formed from a fabric extension of an upper edge of the curtain airbag. The wrap has a first end portion where the wrap merges with the upper edge of the curtain airbag, and an opposite, free second end portion. The wrap is configured to wrap about a circumference of the rolled and/or folded curtain airbag. The second end portion is configured to connect to the first end portion of the wrap to secure the wrap on the curtain airbag and package the curtain airbag in the stored condition.

16 Claims, 4 Drawing Sheets

(56) References Cited

U.S. PATENT DOCUMENTS

| | | | | |
|---|---|---|---|---|
| 6,129,377 A * | 10/2000 | Okumura | B60R 21/213 | 280/730.2 |
| 6,131,944 A * | 10/2000 | Henkel | B60R 21/16 | 280/728.3 |
| 6,135,490 A * | 10/2000 | Spary | B60R 21/213 | 280/730.2 |
| 6,145,879 A * | 11/2000 | Lowe | B60R 21/20 | 280/743.1 |
| 6,460,885 B1 * | 10/2002 | Bowser | B60R 21/231 | 280/743.1 |
| 6,588,793 B2 * | 7/2003 | Rose | B60R 21/2171 | 280/728.2 |
| 6,767,030 B2 * | 7/2004 | Yamaji | B60R 21/205 | 280/732 |
| 6,832,779 B2 * | 12/2004 | Tajima | B60R 21/231 | 280/740 |
| 6,889,999 B2 * | 5/2005 | Dominissini | B60R 21/201 | 280/730.2 |
| 6,921,121 B2 * | 7/2005 | Schneider | B60J 3/0204 | 280/730.1 |
| 6,942,242 B2 * | 9/2005 | Hawthorn | B60R 21/16 | 280/728.2 |
| 6,948,736 B2 * | 9/2005 | DePottey | B60J 3/0213 | 280/728.2 |
| 6,955,377 B2 * | 10/2005 | Cooper | B60R 21/2338 | 280/743.1 |
| 6,976,705 B2 * | 12/2005 | Klaiber | B60R 21/237 | 280/730.2 |
| 7,000,945 B2 * | 2/2006 | Bakhsh | B60R 21/213 | 280/728.2 |
| 7,004,501 B2 * | 2/2006 | Schneider | B60R 21/237 | 280/743.1 |
| 7,083,188 B2 * | 8/2006 | Henderson | B60R 21/201 | 280/728.2 |
| 7,125,037 B2 * | 10/2006 | Tallerico | B60R 21/231 | 280/728.2 |
| 7,144,035 B2 * | 12/2006 | Min | B60R 21/21658 | 280/731 |
| 7,150,470 B2 * | 12/2006 | Okada | B60R 21/205 | 280/743.1 |
| 7,163,231 B2 * | 1/2007 | Kumagai | B60R 21/201 | 280/728.3 |
| 7,234,728 B2 * | 6/2007 | Noguchi | B60R 21/232 | 280/730.2 |
| 7,314,228 B2 * | 1/2008 | Ishiguro | B60R 21/201 | 280/728.1 |
| 7,325,826 B2 * | 2/2008 | Noguchi | B60R 21/232 | 280/730.2 |
| 7,370,880 B2 * | 5/2008 | Hasebe | B60R 21/201 | 280/729 |
| 7,401,805 B2 * | 7/2008 | Coon | B60R 21/213 | 280/730.2 |
| 7,404,570 B2 * | 7/2008 | Miyata | B62J 27/20 | 280/728.2 |
| 7,404,571 B2 * | 7/2008 | Stevens | B60R 21/2171 | 280/728.2 |
| 7,441,796 B2 * | 10/2008 | Noguchi | B60R 21/232 | 280/730.2 |
| 7,445,239 B2 * | 11/2008 | Okada | B60R 21/237 | 280/743.1 |
| 7,631,894 B2 * | 12/2009 | Hasebe | B60R 21/201 | 280/743.2 |
| 7,641,220 B2 * | 1/2010 | Visker | B60R 21/20 | 280/728.2 |
| 7,648,157 B2 * | 1/2010 | Miwa | B60R 21/203 | 280/728.2 |
| 7,648,159 B2 * | 1/2010 | Miyata | B60R 21/23 | 280/730.1 |
| 7,712,769 B2 * | 5/2010 | Hasebe | B60R 21/231 | 280/729 |
| 7,712,781 B2 * | 5/2010 | Klinkenberger | B60R 21/231 | 280/743.1 |
| 7,731,224 B2 * | 6/2010 | Enriquez | B60R 21/232 | 280/730.2 |
| 7,753,407 B2 * | 7/2010 | Yokota | B60R 21/20 | 280/743.2 |
| 7,874,580 B2 * | 1/2011 | Wigger | B60R 21/201 | 280/732 |
| 7,878,539 B2 * | 2/2011 | Maripudi | B60R 21/23 | 280/740 |
| 7,900,958 B2 * | 3/2011 | Yamauchi | B60R 21/231 | 280/732 |
| 7,909,358 B2 * | 3/2011 | Kismir | B60R 22/24 | 280/730.2 |
| 7,918,479 B2 * | 4/2011 | Lim | B60R 21/26 | 280/728.2 |
| 7,946,620 B2 * | 5/2011 | Vigeant | B60R 21/201 | 280/743.1 |
| 7,980,585 B2 * | 7/2011 | Cheal | B60R 21/201 | 280/728.2 |
| 8,056,924 B2 * | 11/2011 | Hatfield | B60R 21/201 | 280/730.2 |
| 8,231,140 B2 * | 7/2012 | Maripudi | B60R 21/2338 | 280/740 |
| 8,240,701 B2 * | 8/2012 | Cheal | B60R 21/201 | 280/728.2 |
| 8,276,936 B2 * | 10/2012 | Shimizu | B60R 21/216 | 280/728.3 |
| 8,297,650 B2 * | 10/2012 | Enders | B60R 21/206 | 280/730.1 |
| 8,308,192 B2 * | 11/2012 | Konishi | B60R 21/213 | 280/743.1 |
| 8,360,464 B2 * | 1/2013 | Enders | B60R 21/206 | 280/730.1 |
| 8,407,968 B2 * | 4/2013 | Lachat | B60R 21/201 | 53/429 |
| 8,414,020 B2 * | 4/2013 | Beppu | B60R 21/2334 | 280/730.2 |
| 8,480,118 B2 * | 7/2013 | Kjell | B60R 21/201 | 280/728.2 |
| 8,491,002 B2 * | 7/2013 | Schneider | B60R 21/215 | 280/728.3 |
| 8,500,155 B2 * | 8/2013 | Enders | B60R 21/205 | 280/728.2 |
| 8,505,961 B2 * | 8/2013 | Jakobsson | B60R 21/232 | 280/728.2 |
| 8,540,276 B2 * | 9/2013 | Schneider | B60R 21/237 | 280/730.1 |
| 8,562,016 B2 * | 10/2013 | Higano | B60R 21/213 | 280/730.2 |
| 8,641,088 B2 * | 2/2014 | Wiik | B60R 21/213 | 280/730.2 |
| 8,651,524 B2 * | 2/2014 | Hardin | B60R 21/201 | 280/743.1 |
| 8,684,401 B2 * | 4/2014 | Shibayama | B60R 21/2334 | 280/730.2 |
| 8,746,738 B2 * | 6/2014 | Matsui | B60R 21/237 | 280/743.1 |
| 8,770,619 B2 * | 7/2014 | Nakamura | B60R 21/213 | 280/730.2 |
| 8,777,262 B2 * | 7/2014 | Enders | B60R 21/2334 | 280/743.2 |
| 8,840,141 B1 * | 9/2014 | Fischer | B60R 21/2346 | 280/743.2 |
| 9,067,564 B2 * | 6/2015 | Kemp | B60R 21/235 | |
| 9,108,589 B2 * | 8/2015 | Rickenbach | B60R 21/207 | |
| 9,156,427 B2 * | 10/2015 | Wang | B60R 21/2338 | |
| 9,199,598 B2 * | 12/2015 | Tsujimoto | B60R 21/20 | |
| 9,387,822 B2 * | 7/2016 | Iida | B60R 21/2346 | |
| 9,403,630 B2 * | 8/2016 | Bowman | B65D 63/1027 | |
| 9,440,609 B2 * | 9/2016 | Osterfeld | B60R 21/201 | |
| 9,539,974 B2 * | 1/2017 | Fukuda | B60R 21/201 | |
| 9,580,036 B2 * | 2/2017 | Choi | B60R 21/213 | |
| 9,650,010 B2 * | 5/2017 | Wang | B60R 21/2338 | |
| 9,682,678 B2 * | 6/2017 | Rose | B60R 21/201 | |
| 9,849,858 B2 * | 12/2017 | Inazumi | B60R 21/2338 | |
| 9,925,943 B2 * | 3/2018 | Ohno | B60R 21/207 | |
| 9,925,946 B2 * | 3/2018 | Webber | B60R 21/201 | |

(56) References Cited

U.S. PATENT DOCUMENTS

| | | | |
|---|---|---|---|
| 9,956,935 B2* | 5/2018 | Kawamura | B60R 21/232 |
| 9,981,625 B2* | 5/2018 | Witt, Jr. | B60R 21/213 |
| 10,053,042 B2* | 8/2018 | Garcia Eireos | B60R 21/201 |
| 10,279,767 B2* | 5/2019 | Motomochi | B60R 21/201 |
| 10,328,886 B2* | 6/2019 | Peyre | B60R 21/261 |
| 10,384,633 B2* | 8/2019 | Warm | B60R 21/2165 |
| 10,384,636 B2* | 8/2019 | Shimizu | D04H 3/011 |
| 10,471,921 B2* | 11/2019 | Ydren | B60R 21/2176 |
| 10,486,633 B2* | 11/2019 | Kino | B60R 21/2165 |
| 10,596,990 B2* | 3/2020 | Sato | B60R 21/201 |
| 10,717,403 B2* | 7/2020 | Shimizu | B60R 21/213 |
| 2002/0084635 A1* | 7/2002 | Tajima | B60R 21/239 280/732 |
| 2002/0096864 A1* | 7/2002 | Asano | B60R 21/232 280/730.2 |
| 2005/0046156 A1* | 3/2005 | Yoshikawa | B60R 21/2171 280/728.2 |
| 2005/0070414 A1* | 3/2005 | Schneider | B60R 21/237 493/405 |
| 2006/0192368 A1* | 8/2006 | Hall | B60R 21/213 280/730.2 |
| 2007/0284858 A1* | 12/2007 | Nishimura | B60R 21/217 280/729 |
| 2007/0296189 A1* | 12/2007 | Berntsson | B60R 21/213 280/730.2 |
| 2008/0217892 A1* | 9/2008 | Maripudi | B60R 21/201 280/740 |
| 2008/0284142 A1* | 11/2008 | Cheal | B60R 21/213 280/730.2 |
| 2009/0102166 A1* | 4/2009 | Brown | B60R 21/201 280/728.2 |
| 2009/0152842 A1* | 6/2009 | Benny | B60R 21/2338 280/728.3 |
| 2013/0093167 A1* | 4/2013 | Volkmann | B60R 21/232 280/729 |
| 2015/0102588 A1* | 4/2015 | Cheal | B60R 21/201 280/728.2 |
| 2015/0191141 A1* | 7/2015 | Wang | B60R 21/216 280/730.2 |
| 2017/0043738 A1* | 2/2017 | Peyre | B60R 21/214 |
| 2019/0256033 A1* | 8/2019 | Schmid | B60R 21/237 |
| 2020/0254955 A1* | 8/2020 | Navarro Arranz | B60R 21/237 |
| 2020/0254959 A1* | 8/2020 | Navarro Arranz | B60R 21/214 |
| 2020/0276954 A1* | 9/2020 | Navarro Arranz | B60R 21/214 |
| 2021/0114545 A1* | 4/2021 | Moran | B60R 21/201 |
| 2021/0253053 A1* | 8/2021 | Callewaert | B60R 21/232 |

* cited by examiner

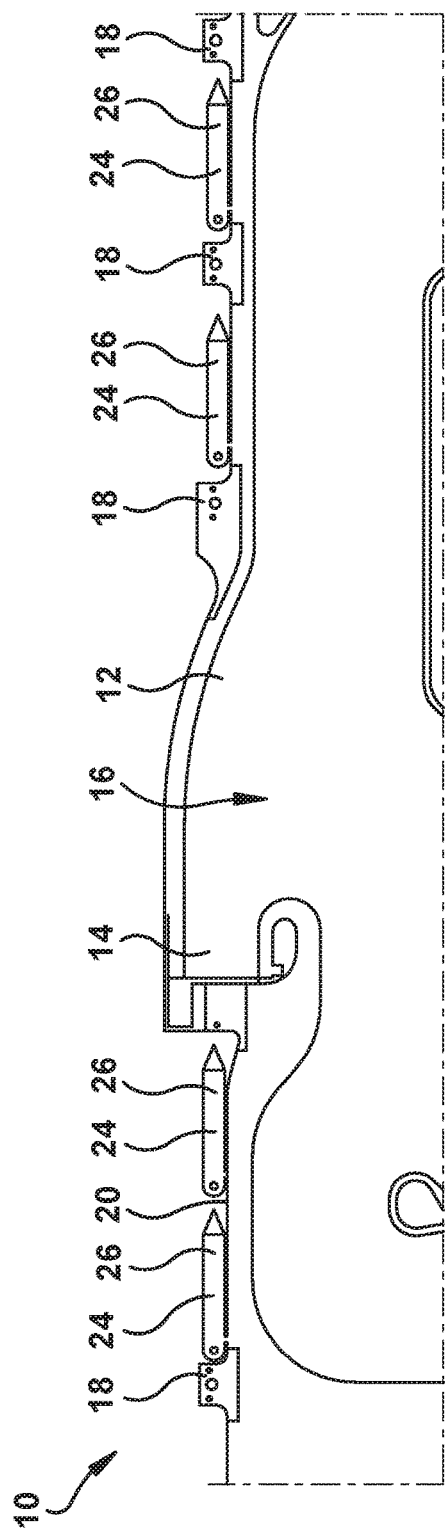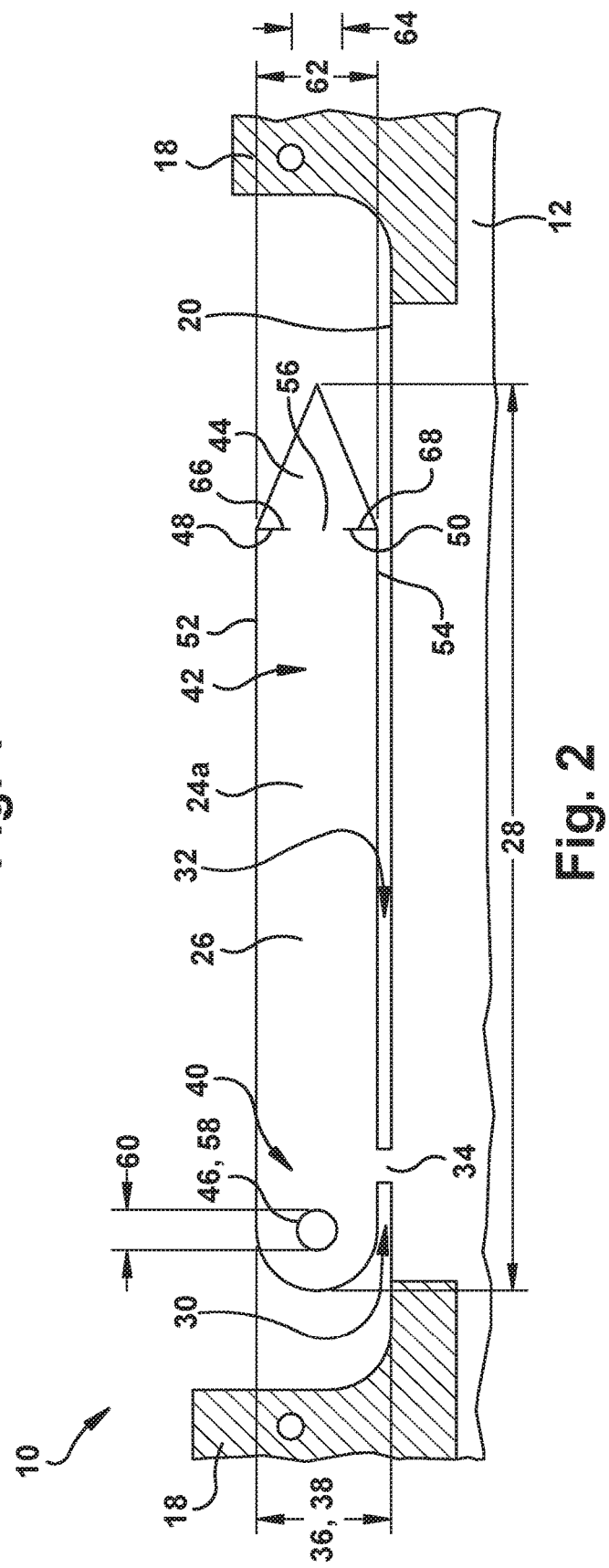

CURTAIN AIRBAG WITH INTEGRAL AIRBAG WRAP

FIELD OF THE INVENTION

The invention relates to an apparatus for helping to protect an occupant of a vehicle. More particularly, the invention relates to a curtain airbag inflatable between a vehicle occupant and a side structure of a vehicle and means for packaging the airbag.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain that is fixed to the roof of the vehicle and/or to a support structure adjacent to the roof of the vehicle. The inflatable curtain is configured to inflate from the roof of the vehicle downward inside the passenger compartment in the event of a side impact or a vehicle rollover. The inflatable curtain, when inflated, is positioned between a vehicle occupant and the side structure of the vehicle.

Inflatable curtains are typically placed in the stored condition by rolling and/or folding. Rolling is, however, typically the primary manner in which inflatable curtains are placed in a packaged condition, ready for installation in the vehicle. The "packaged condition" refers to the inflatable curtain in its ready-to-install condition, regardless of whether it is rolled, folded, or a combination of rolled and folded. In the packaged condition, the inflatable curtain can also include additional features and/or structures, such as tape, packaging sleeves and/or wraps, installation and/or fastening structures (fasteners, clamps, brackets, etc.), and inflation components, such as inflators, fill tubes, diffusers, etc.

Certain inflatable curtains utilize the tape, packaging sleeves, and/or packaging wraps to hold the inflatable curtain in the packaged condition. The use of tape in the process for packaging inflatable curtains requires additional steps of manufacturing/acquiring tape that is cut to a desired length and attaching the tape to the rolled and/or folded inflatable curtains. Packaging sleeves and/or wraps are typically formed separately from the inflatable curtain. The separately formed packaging sleeves and/or wraps can made be from the same airbag fabric that forms the inflatable curtain, or from other materials. Regardless of the construction, the process for packaging the inflatable curtains using the separately formed packaging sleeves and/or wraps requires additional steps of manufacturing the packaging sleeves and/or wraps and attaching the separately formed packaging sleeves and/or wraps to, or installing the separately formed packaging sleeves and/or wraps on, the rolled and/or folded inflatable curtain.

SUMMARY OF THE INVENTION

According to one aspect, an apparatus for helping to protect an occupant of a vehicle includes a curtain airbag having a stored condition in which the curtain airbag is deflated, flattened, and rolled and/or folded. A wrap comprises an integral woven portion of the curtain airbag formed from a fabric extension of an upper edge of the curtain airbag. The wrap has a first end portion where the wrap merges with the upper edge of the curtain airbag, and an opposite, free second end portion. The wrap is configured to wrap about a circumference of the rolled and/or folded curtain airbag. The second end portion is configured to connect to the first end portion of the wrap to secure the wrap on the curtain airbag and package the curtain airbag in the stored condition.

According to another aspect, alone or in combination with any other aspect, the first end portion of the wrap can comprise a retention feature. The second end portion of the wrap can comprise an attachment feature. The attachment feature can be configured to cooperate with the retention feature to maintain the wrap wrapped about the curtain airbag. The attachment feature and the retention feature can be formed from the curtain airbag fabric.

According to another aspect, alone or in combination with any other aspect, the attachment feature can be inserted through an opening in the retention feature to secure the second end portion of the wrap to the first end portion of the wrap.

According to another aspect, alone or in combination with any other aspect, the attachment feature can be defined by edge slits formed in opposite edges of the second portion of the wrap, leaving the attachment feature connected to the remainder of the second end portion by an attachment bridge. The retention feature can comprise at least one opening in the first end portion of the wrap. The attachment feature of the wrap can be configured to pass through the opening in the first end portion of the wrap with the attachment bridge being received in the opening. The edge slits can define attachment edges of the attachment feature that can engage the curtain airbag fabric adjacent the opening to secure the attachment feature to the retention feature.

According to another aspect, alone or in combination with any other aspect, the opening can have a diameter that is shorter than a maximum width of the attachment feature. The edge slits can be configured such that they terminate a distance from each other that is about equal to the diameter of the opening so that the width of the attachment bridge is about equal to the length of the opening.

According to another aspect, alone or in combination with any other aspect, the first end portion of the wrap can comprise a retention tab comprising a portion of the extension defined by a slit that separates the retention tab from a remainder of the first end portion of the wrap. The second end portion of the wrap can be configured to connect to the retention tab after being wrapped about the circumference of the rolled and/or folded curtain airbag.

According to another aspect, alone or in combination with any other aspect, the retention tab can comprise a retention feature. The second end portion of the wrap can comprise an attachment feature. The attachment feature can be configured to cooperate with the retention feature to maintain the wrap wrapped about the curtain airbag. The attachment feature and the retention feature can be formed from the curtain airbag fabric.

According to another aspect, alone or in combination with any other aspect, the attachment feature can be defined by edge slits formed in opposite edges of the second portion of the wrap, leaving the attachment feature connected to the remainder of the second end portion by an attachment bridge. The retention feature can comprise at least one opening in the retention tab. The attachment feature of the wrap can be configured to pass through the at least one opening in the retention tab with the attachment bridge being received in the at least one opening. The edge slits can define attachment edges of the attachment feature that can engage the curtain airbag fabric adjacent the at least one opening of the retention tab to secure the attachment feature to the retention feature.

According to another aspect, alone or in combination with any other aspect, the retention tab can have a first opening on a first portion of the retention tab and a second opening on a second portion of the retention tab. The first portion of the retention tab can be folded over onto the second portion of the retention tab so that the first and second openings overlie one another. The attachment feature can be configured to pass through the overlying first and second openings in the retention tab with the attachment bridge being received in the overlying first and second openings.

According to another aspect, alone or in combination with any other aspect, the extension can have a length measured lengthwise along the upper edge of the curtain airbag. The wrap can be defined by at least one slit cut lengthwise along the extension to separate the wrap from the upper edge of the curtain airbag.

According to another aspect, alone or in combination with any other aspect, the wrap can be defined by a pair of slits cut lengthwise along the extension to separate the wrap from the upper edge of the curtain airbag, leaving the wrap connected to the upper edge of the curtain airbag by a tab.

According to another aspect, alone or in combination with any other aspect, the first end portion of the wrap can have at least one opening for receiving a portion of the second end portion of the wrap to secure the second end portion to the first end portion. The at least one opening can be longitudinally offset from the tab.

According to another aspect, alone or in combination with any other aspect, the extension can have a width that is equal to the width of the wrap such that the integral addition of the wrap to the curtain airbag requires only the fabric that forms the wrap.

According to another aspect, alone or in combination with any other aspect, the wrap, in a lied flat and unfolded configuration, can extend lengthwise along the upper edge of the curtain airbag.

According to another aspect, alone or in combination with any other aspect, the curtain airbag can be a one-piece woven ("OPW") curtain airbag. The wrap can be an integral woven portion of the OPW curtain airbag.

According to another aspect, alone or in combination with any other aspect, the curtain airbag can be formed from a plurality of woven pieces that are interconnected to one another. The wrap can be an integral woven portion of at least one of the woven pieces that form the curtain airbag.

According to another aspect, alone or in combination with any other aspect, a curtain airbag module can comprise the apparatus.

According to another aspect, alone or in combination with any other aspect, a vehicle safety system can comprise the curtain airbag module.

According to another aspect, alone or in combination with any other aspect, an apparatus for helping to protect an occupant of a vehicle can include a curtain airbag having a stored condition in which the curtain airbag is deflated, flattened, and rolled and/or folded. A wrap can comprise an integral woven portion of the curtain airbag formed from a fabric extension of an upper edge of the curtain airbag when in a manufacturing state. The wrap, when in a post-manufacturing state, can be removed from the remainder of the curtain airbag and wrapped about a circumference of the rolled and/or folded curtain airbag to secure the wrap on the curtain airbag and package the curtain airbag in the stored condition.

According to another aspect, alone or in combination with any other aspect, a first end portion of the wrap can have an opening for receiving a portion of a second end portion of the wrap. The second end portion of the wrap can be received in the opening after the wrap is wrapped about the circumference of the rolled and/or folded curtain airbag to secure the second end portion to the first end portion and maintain the packaging of the curtain airbag in the stored condition.

BRIEF DESCRIPTION OF THE DRAWINGS

The foregoing and other features of the invention will become apparent to one skilled in the art to which the invention relates upon consideration of the following description of the invention with reference to the accompanying drawings, in which:

FIG. 1 is a schematic side view illustrating an apparatus for helping to protect an occupant of a vehicle;

FIG. 2 is a schematic side view of an element of the apparatus of FIG. 1, including a first configuration for a portion of the apparatus;

DETAILED DESCRIPTION OF THE INVENTION

Figure 3:
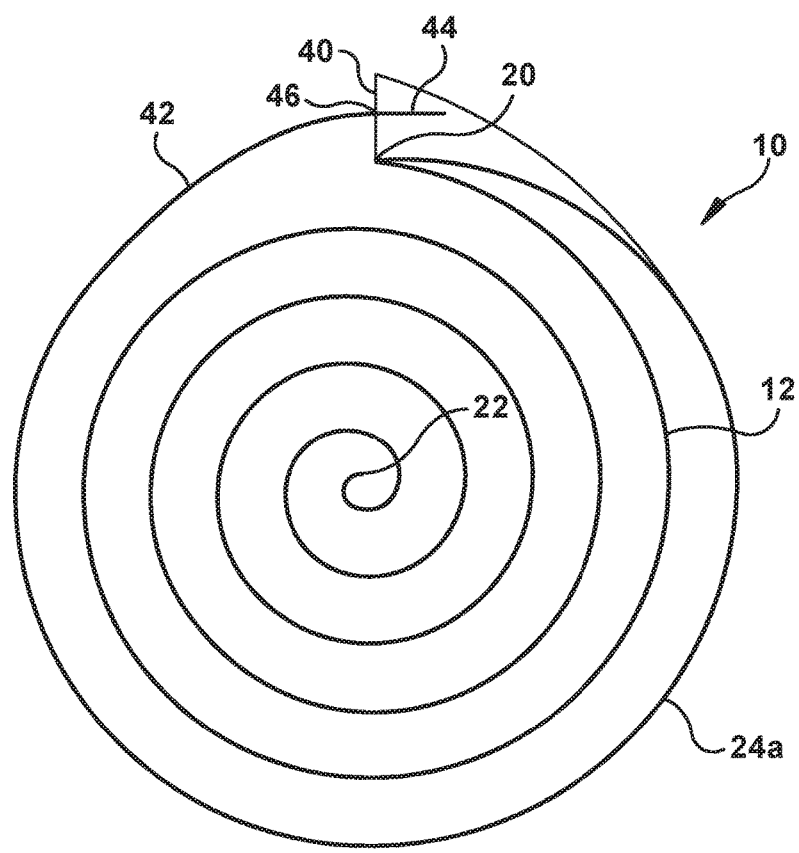
FIG. 3 is a schematic view of a portion of the apparatus of FIG. 2, including the apparatus in a packaged configuration.

As shown in FIG. 1, an apparatus 10 for helping to protect an occupant of a vehicle includes an inflatable vehicle occupant protection device 12 in the form of an airbag, such as a curtain airbag, for helping to protect the vehicle occupant. The curtain airbag 12 can be constructed of any suitable material, such as nylon (e.g., woven nylon 6-6 yarns), and can be constructed in any suitable manner. For example, the curtain airbag 12 may have a one-piece woven (OPW) construction in which the curtain airbag is woven as a single piece of material. As another example, the curtain airbag 12 can include more than one piece of material. If more than one piece is used, the pieces can be interconnected by known means, such as stitching, ultrasonic welding, heat bonding, or adhesives, to form the curtain airbag 12. The curtain airbag 12 can be uncoated, coated with a material, such as a gas impermeable urethane, or laminated with a material, such as a gas impermeable film. The curtain airbag 12 thus can have a gas-tight or substantially gas-tight construction. Those skilled in the art will appreciate that alternative materials, such as polyester yarn, and alternatives coatings, such as silicone, can also be used to construct the curtain airbag 12.

An inflator (not shown) can be operatively connected to the curtain airbag 12 and be actuatable to provide inflation fluid for inflating the curtain airbag from a stored condition to a deployed condition. In the example configuration of FIG. 1, an inflator mouth 14 of the curtain airbag 12 can be in fluid communication with an inflatable volume 16. The inflator can be inserted and secured in the inflator mouth 14. The inflator can be of any known type, such as stored gas, solid propellant, augmented, or hybrid. An airbag controller (not shown) can be operatively connected to the inflator. The airbag controller is configured to actuate the inflator in response to sensing the occurrence of an event for which occupant protection is desired, such as a collision.

The curtain airbag 12 can be mounted to a support structure of the vehicle. The support structure can be any structure in the vehicle that will accommodate the curtain airbag 12 being deployed therefrom so that the deployed curtain airbag is positioned between a side structure of the vehicle, such as a vehicle door, a side window, a roof rail, and/or a vehicle pillar, and a vehicle occupant. The support structure can be a roof rail of the vehicle. In the example configuration depicted in FIG. 1, the curtain airbag 12 includes a plurality of mounting tabs 18 for mounting the curtain airbag to the roof rail. The mounting tabs 18 are spaced lengthwise along an upper edge 20 of the curtain airbag 12. Alternatively, the curtain airbag 12 can be mounted to the roof rail in any other desired manner.

To install the curtain airbag 12 in the vehicle, the curtain airbag is deflated, flattened, and rolled and/or folded. FIG. 1 depicts an upper portion of the curtain airbag 12 in a deflated and flattened condition. The deflated and flattened curtain airbag 12 is then rolled and/or folded such as by rolling a lower edge 22 (see FIG. 3) of the curtain airbag upward toward the upper edge 22. Once the curtain airbag 12 is rolled and/or folded, the curtain airbag can be packaged. By "package" or "packaged," it is meant that the curtain airbag 12 is maintained rolled and/or folded in the stored condition so that the curtain airbag and certain associated components, such as inflators, fill tubes, connectors, etc., can be installed in the vehicle as a unit. Thus, reference to "packaging the curtain airbag" and the like means placing the curtain airbag 12 into a condition in which the curtain airbag is maintained in the stored condition so that the curtain airbag is in a ready-to-install condition. Reference to the "packaged curtain airbag," "the curtain airbag package," and/or the like means a curtain airbag 12 that is maintained in the stored condition so that the curtain airbag is in a ready-to-install condition.

Certain curtain airbags utilize wrapping structures, such as tape, packaging sleeves, and/or packaging wraps, to hold a curtain airbag in the packaged condition. These wrapping structures are typically formed separately from the curtain airbag. In some instances, these separately formed wrapping structures are made from materials that are different than the airbag fabric that forms the curtain airbag. In other instances, the separately formed wrapping structures are made from the same material used to form the curtain airbag. Regardless of the construction, the process for packaging a curtain airbag using the separately formed wrapping structures requires additional steps of manufacturing the separately formed wrapping structures and attaching the separately formed wrapping structures to, or installing the separately formed wrapping structures on, the rolled and/or folded curtain airbag.

To help reduce the use of additional material and the manufacturing steps required to package the curtain airbag 12, the apparatus 10 includes at least one wrap 24 formed as an integrally woven portion of the curtain airbag. The wrap 24 takes the form of a fabric extension 26 of the upper edge 20 of the curtain airbag formed by cutting and removing airbag materials, leaving the wrap. The curtain airbag 12 can be an OPW curtain airbag or a curtain airbag formed from a plurality of woven pieces. When the curtain airbag 12 is formed from a plurality of woven pieces, the wrap 24 is formed as an integral woven portion of at least one of the woven pieces that form the curtain airbag. In both configurations, the wrap 24 is configured to be wrapped about the circumference of the rolled and/or folded curtain airbag 12 and secured to itself to package the curtain airbag in the stored condition.

From the description set forth herein, it will be appreciated that the wrap 24 may have various configurations, some of which will be discussed below in FIGS. 2-7, which depict example configurations of the wrap. The example configurations are not necessarily exclusive of each other. Those skilled in the art will appreciate that certain features can be shared and/or combined between the example configurations whether expressly stated, shown, or not. Common or similar elements shared between the example configurations of the wrap 24 include common reference characters.

Figure 4:
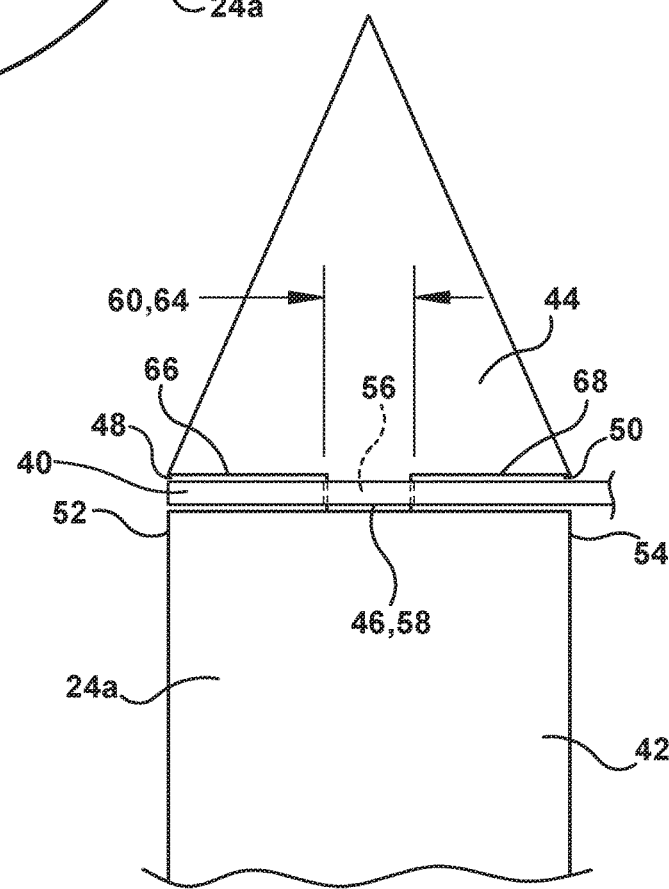
FIG. 4 is a top view of a portion of the apparatus of FIG. 2, including the apparatus in the packaged configuration.

FIGS. 2-4 depict an example configuration of a wrap 24a formed as an integrally woven portion of an OPW curtain airbag 12. As shown in FIG. 2, a fabric extension 26 forming the wrap 24a has a length 28 measured lengthwise along the upper edge 20 of the curtain airbag 12. The wrap 24a is defined by a pair of slits 30, 32 cut lengthwise along the fabric extension 26 to separate the wrap from the upper edge 20 of the curtain airbag 12. The pair of slits 30, 32 terminate at a distance from one another to define a tab 34. The wrap 24a is connected to the upper edge 20 of the curtain airbag only by the tab 34. The wrap 24a, in a lied flat and unfolded configuration, thus extends lengthwise along the upper edge 20 of the curtain airbag 12. The fabric extension 26 has a width 36 that is equal to a width 38 of the wrap 24a such that the integral addition of the wrap to the curtain airbag 12 requires only the fabric that forms the wrap. As viewed in FIG. 2, the width 38 of the wrap 24a does not extend beyond the widths of the mounting tabs 18 of the curtain airbag 12. Therefore, the inclusion of the wrap 24a does not affect the overall height of the curtain airbag 12, which minimizes material waste during construction.

A first end portion 40 of the wrap 24a merges with the upper edge 20 of the curtain airbag 12 through the tab 34. An opposite, free second end portion 42 of the wrap 24a is configured for a connection to the first end portion 40 to secure the wrap on the curtain airbag 12 and package the curtain airbag in the stored condition.

To connect the second end portion 42 of the wrap 24a to the first end portion 40, the second end portion comprises an attachment feature 44 configured to cooperate with a retention feature 46 positioned at the first end portion. In FIGS. 1-4, the attachment feature 44 is arrow-shaped. The attachment feature 44, however, can be any other desired shape. The attachment feature 44 and the retention feature 46 can be formed from the curtain airbag fabric, such as from a portion of the fabric extension 26 that forms the wrap 24a. In the example configuration of FIGS. 2-4, the attachment feature 44 comprises edge slits 48, 50 formed in opposite edges 52, 54 of the second end portion 42. The edge slits 48, 50 terminate at a distance from each other to define an attachment bridge 56. The attachment feature 44 thus is connected to the remainder of the second end portion 42 only by the attachment bridge 56.

The retention feature 46 comprises an opening 58 in the first end portion 40. As shown in the example configuration of FIG. 2, the opening 58 is longitudinally offset from the tab 34. In the example configuration of FIGS. 2-4, the opening 58 has a diameter 60 that is shorter than a maximum width 62 of the attachment feature 44. The opening 58 is thus dimensioned to form an interference with the attachment feature 44.

As shown in FIGS. 3-4, after the wrap 24a is wrapped around the circumference of the stored curtain airbag 12, the attachment feature 44 is passed through the opening 58. Although the maximum width 62 of the attachment feature 44 is longer than the diameter 60 of the opening 58, the attachment feature is able to be passed through the opening because of the flexible nature of the fabric extension 26 that forms the wrap 24a. The attachment bridge 56 is seated in the opening 58 once the attachment feature 44 has been inserted therethrough. In order to accommodate this arrangement, the attachment bridge 56 can have a width 64 that is about equal to the diameter 60 of the opening 58. Alternatively, the width 64 of the attachment bridge 56 can be longer than the diameter 60 of the opening 58. In this configuration, the attachment bridge 56 is curled, flexed and/or folded while seated in the opening 58.

Referring to FIG. 4, attachment edges 66, 68 defined by the edge slits 48, 50 engage the curtain airbag fabric adjacent the opening 58 to secure and maintain the attachment feature 44 inserted through the opening. This arrangement helps resist removal of the attachment feature 44 from the opening 58 in response to tension forces applied to the wrap 24a.

The attachment of the second end portion 42 of the wrap 24a to the first end portion 40 thus provides a secure connection between the first and second end portions. This connection maintains the curtain airbag 12 packaged in the stored condition. The attachment feature 44 of the wrap 24a can, however, be configured to be pulled back out through the opening 58 in response to deployment of the curtain airbag 12. The wrap 24a thus holds the curtain airbag 12 packaged in the stored condition until the curtain airbag deploys. The wrap 24a can also be configured with at least one rupturable portion that ruptures in response to the deployment of the curtain airbag 12. In this configuration, the attachment feature 44 can remain inserted through the opening 58 during the deployment of the curtain airbag 12.

Although the retention feature 46 is shown as comprising only one opening 58, the retention feature can comprise a plurality of openings. For example, the retention feature 46 can comprise two openings 58. In this configuration, the first end portion 40 of the wrap 24a can be folded over onto itself to overlay the openings 58. After the wrap 24a is wrapped around the circumference of the stored curtain airbag 12, the attachment feature 44 can then be passed through the overlying openings 58 and secured to the retention feature 46 in a similar manner as described above. The folding of the first end portion 40 and the addition of a second opening 58 may provide for a more secure attachment of the second end portion 42 to the first end portion than what the single opening configuration provides.

Furthermore, although the wrap 24a is integrally formed with the curtain airbag 12, the wrap can be separated from the curtain airbag prior to use. In this configuration, the wrap 24a comprises an integral woven portion of the curtain airbag 12 when in a manufacturing state. After the curtain airbag 12 and integral wrap 24a are manufactured, the wrap can be removed from the remainder of the curtain airbag, such as by cutting through the tab 34. The separated wrap 24a can then be wrapped about the circumference of the rolled and/or folded curtain airbag 12 and secured on the curtain airbag in a similar manner as described above.

Figure 5:
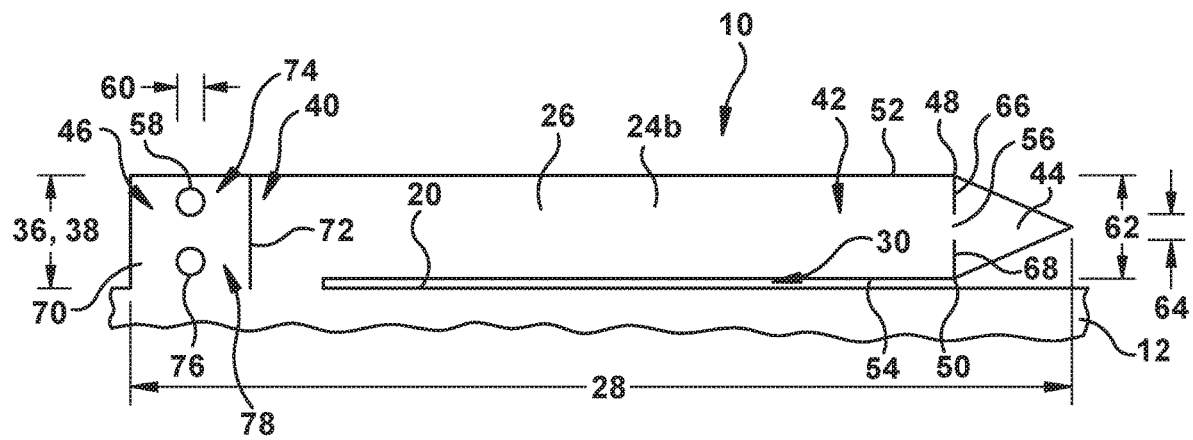
FIG. 5 is a schematic side view of an element of the apparatus of FIG. 1, including a second configuration for a portion of the apparatus.
Figure 6:
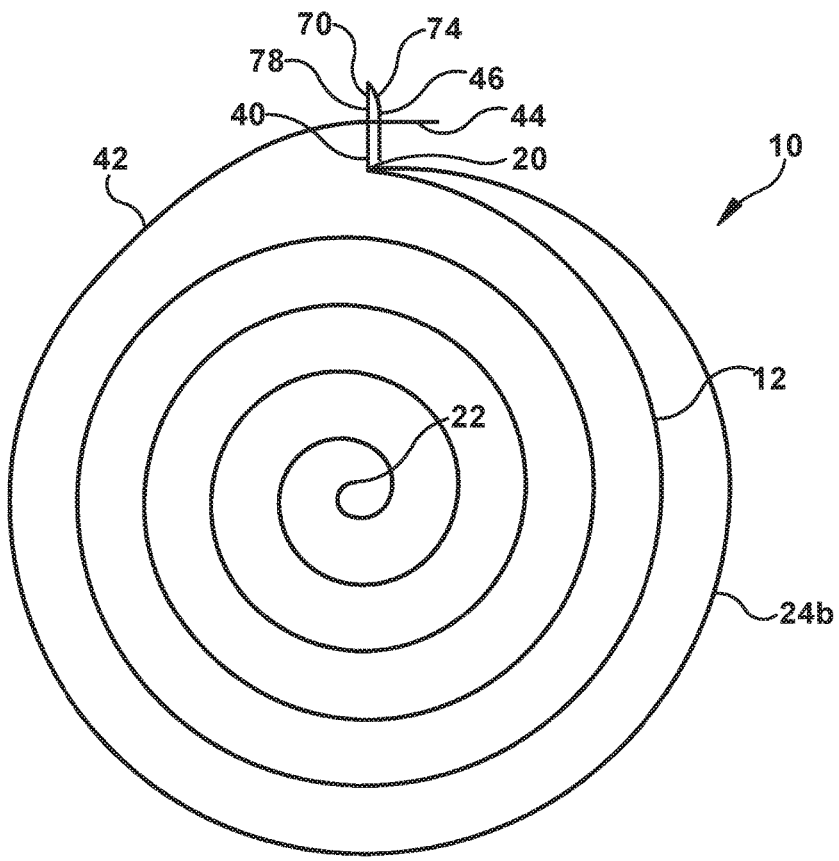
FIG. 6 is a schematic view of a portion of the apparatus of FIG. 5, including the apparatus in a packaged configuration.
Figure 7:
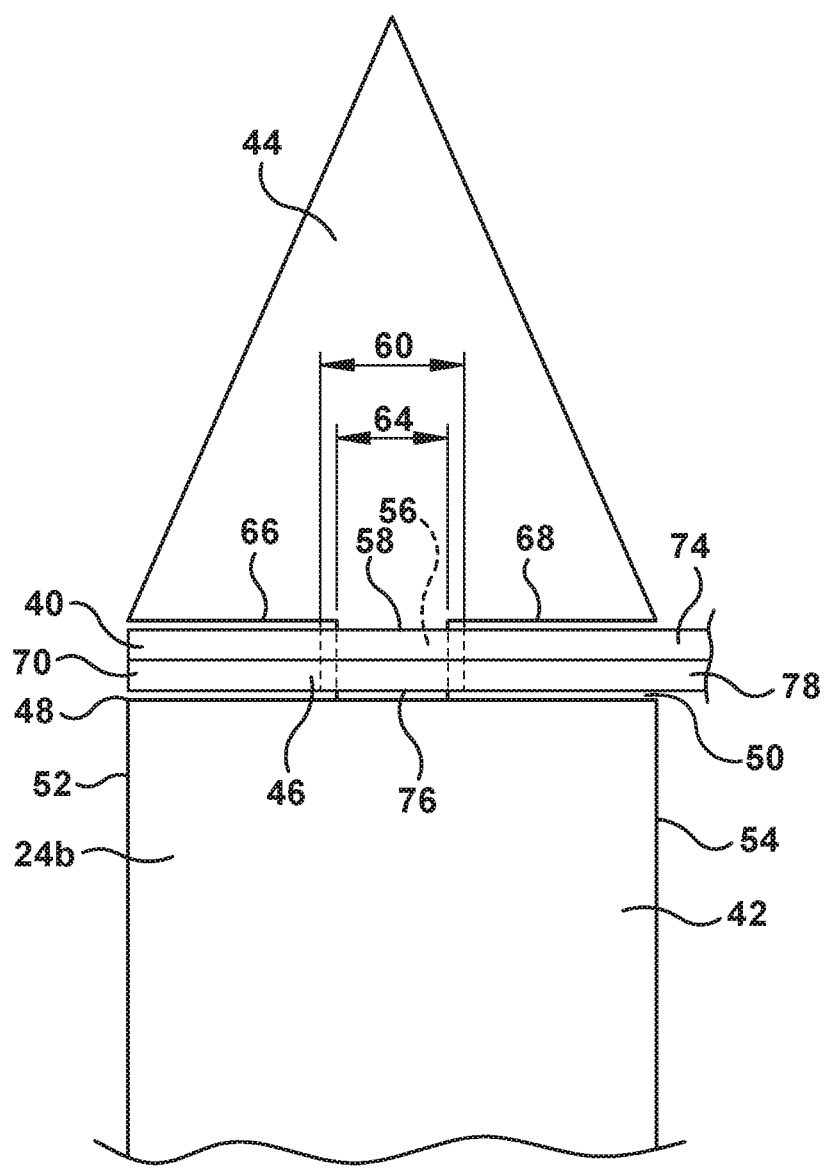
FIG. 7 is a top view of a portion of the apparatus of FIG. 5, including the apparatus in the packaged configuration.

FIGS. 5-7 depict another example configuration of a wrap 24b formed as an integrally woven portion of an OPW curtain airbag 12. As shown in FIG. 5, a fabric extension 26 forming the wrap 24b has a length 28 measured lengthwise along the upper edge 20 of the curtain airbag 12. The wrap 24b is defined by a slit 30 cut lengthwise along the fabric extension 26 to separate the wrap from the upper edge 22 of the curtain airbag 12. The wrap 24b, in a lied flat and unfolded configuration, thus extends lengthwise along the upper edge 20 of the curtain airbag 12. The fabric extension 26 has a width 36 that is equal to a width 38 of the wrap 24b such that the integral addition of the wrap to the curtain airbag 12 requires only the fabric that forms the wrap.

A first end portion 40 of the wrap 24b merges with the upper edge 20 of the curtain airbag 12. An opposite, free second end portion 42 of the wrap 24b is configured for a connection to the first end portion 40 to secure the wrap on the curtain airbag 12 and package the curtain airbag in the stored condition.

To connect the second end portion 42 of the wrap 24b to the first end portion 40, the second end portion of the wrap comprises an attachment feature 44 configured to cooperate with a retention feature 46 positioned at the first end portion. In FIGS. 5-7, the attachment feature 44 is arrow-shaped. The attachment feature 44, however, can be any other desired shape. The attachment feature 44 and the retention feature 46 can be formed from the curtain airbag fabric, such as from a portion of the fabric extension 26 that forms the wrap 24b. In the example configuration of FIGS. 5-7, the attachment feature 44 comprises edge slits 48, 50 formed in opposite edges 52, 54 of the second end portion 42. The edge slits 48, 50 terminate at a distance from each other to define an attachment bridge 56. The attachment feature 44 thus is connected to the remainder of the second end portion 42 only by the attachment bridge 56.

The retention feature 46 comprises a retention tab 70 in the first end portion 40 of the wrap 24b. The retention tab 70 comprises a portion of the fabric extension 26 and is defined by a slit 72 that separates the retention tab from a remainder of the first end portion 40. A first opening 58 extends through a first portion 74 of the retention tab 70. A second opening 76 extends through a second portion 78 of the retention tab 70. In the example configuration of FIGS. 5-7, each of the openings 58, 76 has a diameter 60 that is shorter than a maximum width 62 of the attachment feature 44. The openings 58, 76 are thus dimensioned to form an interference with the attachment feature 44. Instead of having two openings 58, 76, the retention tab 70 can include any number of openings extending therethrough.

As shown in FIGS. 6-7, the first portion 74 of the retention tab 70 can be folded over onto the second portion 78 of the retention tab to overlay the first and second openings 58, 76. After the wrap 24b is wrapped around the circumference of the stored curtain airbag 12, the attachment feature 44 is passed through the overlying openings 58, 76. Although the maximum width 62 of the attachment feature 44 is longer than the lengths 60 of the overlying openings 58, 76 the attachment feature is able to be passed through the openings because of the flexible nature of the fabric extension 26 that forms the wrap 24b. The attachment bridge 56 is seated in the openings 58, 76 once the attachment feature 44 has been inserted therethrough. In order to accommodate this arrangement, the attachment bridge 56 can have a width 64 that is about equal to the lengths 60 of the openings 58, 76. Alternatively, the width 64 of the attachment bridge 56 can be longer than the lengths 60 of the openings 58, 76. In this configuration, the attachment bridge 56 is curled, flexed and/or folded while seated in the openings 58, 76.

Referring to FIG. 7, attachment edges 66, 68 defined by the edge slits 48, 50 engage the curtain airbag fabric adjacent the opening 58 of the retention tab 70 to secure and maintain the attachment feature 44 inserted through the opening. This arrangement helps resist removal of the attachment feature 44 from the openings 58, 76 in response to tension forces applied to the wrap 24*b*.

The attachment of the second end portion 42 of the wrap 24*b* to the first end portion 40 thus provides a secure connection between the first and second end portions. This connection maintains the curtain airbag 12 packaged in the stored condition. The attachment feature 44 of the wrap 24*b* can, however, be configured to be pulled back out through the overlying openings 58, 76 in response to deployment of the curtain airbag 12. The wrap 24*b* thus holds the curtain airbag 12 packaged in the stored condition until the curtain airbag deploys. The wrap 24*b* can also be configured with at least one rupturable portion that ruptures in response to the deployment of the curtain airbag 12. In this configuration, the attachment feature 44 can remain inserted through the overlying openings 58, 76 during the deployment of the curtain airbag 12.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for helping to protect an occupant of a vehicle, comprising:
   a curtain airbag having a stored condition in which the curtain airbag is deflated, flattened, and rolled and/or folded; and
   a wrap comprising an integral woven portion of the curtain airbag formed from a fabric extension of an upper edge of the curtain airbag, the wrap being configured to wrap about a circumference of the rolled and/or folded curtain airbag, the wrap having a first end portion where the wrap merges with the upper edge of the curtain airbag, and an opposite, free second end portion, the first end portion of the wrap comprising a retention feature formed from curtain airbag fabric and the second end portion of the wrap comprising an attachment feature formed from the curtain airbag fabric, wherein the attachment feature is inserted through an opening in the retention feature after the wrap is wrapped about the circumference of the rolled and/or folded airbag to secure the second end portion of the wrap to the first end portion of the wrap and thereby maintain the wrap wrapped about the curtain airbag and package of the curtain airbag in the stored condition.

2. The apparatus recited in claim 1, wherein the attachment feature is defined by edge slits formed in opposite edges of the second portion of the wrap, leaving the attachment feature connected to the remainder of the second end portion by an attachment bridge, and the retention feature comprises at least one opening in the first end portion of the wrap, wherein the attachment feature of the wrap is configured to pass through the opening in the first end portion of the wrap with the attachment bridge being received in the opening, and wherein the edge slits define attachment edges of the attachment feature that engage the curtain airbag fabric adjacent the opening to secure the attachment feature to the retention feature.

3. The apparatus recited in claim 2, wherein the opening has a diameter that is shorter than a maximum width of the attachment feature, and wherein the edge slits are configured such that they terminate a distance from each other that is about equal to the diameter of the opening so that the width of the attachment bridge is about equal to the length of the opening.

4. The apparatus recited in claim 1, wherein the first end portion of the wrap comprises a retention tab comprising a portion of the extension defined by a slit that separates the retention tab from a remainder of the first end portion of the wrap, the retention tab comprising the retention feature.

5. The apparatus recited in claim 4, wherein the attachment feature is defined by edge slits formed in opposite edges of the second portion of the wrap, leaving the attachment feature connected to the remainder of the second end portion by an attachment bridge, wherein the attachment feature of the wrap is configured to pass through the at least one opening in the retention tab with the attachment bridge being received in the at least one opening, and wherein the edge slits define attachment edges of the attachment feature that engage the curtain airbag fabric adjacent the at least one opening of the retention tab to secure the attachment feature to the retention feature.

6. The apparatus recited in claim 5, wherein the retention tab has a first opening on a first portion of the retention tab and a second opening on a second portion of the retention tab, the first portion of the retention tab being folded over onto the second portion of the retention tab so that the first and second openings overlie one another, and wherein the attachment feature is configured to pass through the overlying first and second openings in the retention tab with the attachment bridge being received in the overlying first and second openings.

7. The apparatus recited in claim 1, wherein the extension has a length measured lengthwise along the upper edge of the curtain airbag, and wherein the wrap is defined by at least one slit cut lengthwise along the extension to separate the wrap from the upper edge of the curtain airbag.

8. The apparatus recited in claim 7, wherein the wrap is defined by a pair of slits cut lengthwise along the extension to separate the wrap from the upper edge of the curtain airbag, leaving the wrap connected to the upper edge of the curtain airbag by a tab.

9. The apparatus recited in claim 8, wherein the opening in the retention feature is longitudinally offset from the tab.

10. The apparatus recited in claim 7, wherein the extension has a width that is equal to the width of the wrap such that the integral addition of the wrap to the curtain airbag requires only the fabric that forms the wrap.

11. The apparatus recited in claim 7, wherein the wrap, in a lied flat and unfolded configuration, extends lengthwise along the upper edge of the curtain airbag.

12. The apparatus recited in claim 1, wherein the curtain airbag is a one-piece woven ("OPW") curtain airbag, the wrap being an integral woven portion of the OPW curtain airbag.

13. The apparatus recited in claim 1, wherein the curtain airbag is formed from a plurality of woven pieces that are interconnected to one another, the wrap being an integral woven portion of at least one of the woven pieces that form the curtain airbag.

14. A curtain airbag module comprising the apparatus of claim 1.

15. A vehicle safety system comprising the curtain airbag module of claim 14.

16. An apparatus for helping to protect an occupant of a vehicle, comprising:
   a curtain airbag having a stored condition in which the curtain airbag is deflated, flattened, and rolled and/or folded; and a wrap comprising an integral woven portion of the curtain airbag formed from a fabric extension of an upper edge of the curtain airbag when in a manufacturing state, the wrap, when in a post-manufacturing state, being removed from the remainder of the curtain airbag and wrapped about a circumference of the rolled and/or folded curtain airbag to secure the wrap on the curtain airbag and package the curtain airbag in the stored condition, the removed wrap forming a single strip of curtain airbag fabric having a first end portion and a second end portion, the first end portion having an opening for receiving a portion of the second end portion, the second end portion being received in the opening after the wrap is wrapped about the circumference of the rolled and/or folded curtain airbag to secure the second end portion to the first end portion and maintain the packaging of the curtain airbag in the stored condition.

* * * * *